US008432568B2

(12) United States Patent
Yamaguchi

(10) Patent No.: US 8,432,568 B2
(45) Date of Patent: Apr. 30, 2013

(54) INFORMATION DISTRIBUTION APPARATUS, METHOD FOR DISTRIBUTING INSTALLATION PROGRAM, AND STORAGE MEDIUM

(75) Inventor: Kotaro Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

(21) Appl. No.: 12/730,126

(22) Filed: Mar. 23, 2010

(65) Prior Publication Data

US 2010/0245909 A1  Sep. 30, 2010

(30) Foreign Application Priority Data

Mar. 26, 2009  (JP) ................................. 2009-077065

(51) Int. Cl.
*G06F 15/00* (2006.01)

(52) U.S. Cl.
USPC ........................ 358/1.15; 358/1.13; 358/434

(58) Field of Classification Search .................... 358/1.1, 358/1.9, 1.13, 1.15, 401, 434, 468
See application file for complete search history.

(56) References Cited

U.S. PATENT DOCUMENTS

| 7,978,360 B2 * | 7/2011 | Tamai et al. ................. 358/1.15 |
| 2005/0024671 A1 | 2/2005 | Abe |
| 2008/0209449 A1 | 8/2008 | Maehira |
| 2010/0177349 A1 * | 7/2010 | Tarumi ......................... 358/1.15 |

FOREIGN PATENT DOCUMENTS

| JP | 2005-63415 A | 3/2005 |
| JP | 2007-42062 A | 2/2007 |
| JP | 2008-210284 A | 9/2008 |

* cited by examiner

*Primary Examiner* — Thomas D Lee

(74) *Attorney, Agent, or Firm* — Canon U.S.A., Inc IP Division

(57) ABSTRACT

There is disclosed an information distribution apparatus including: acquiring log information of a job; generating, based on the log information, setting information denoting an operation setting of a device and usable by a program for operating the device; and transmitting an installation program including a set of the program and the setting information, to an information processing apparatus which gives operation instructions to the device.

12 Claims, 21 Drawing Sheets

FIG.6
500 DEVICE MANAGEMENT TABLE

| UNIT NO. | MODEL | IP ADDRESS | PDL | BOOKBINDING | STAMP | BOX | CUSTOMER ID |
|---|---|---|---|---|---|---|---|
| AAA00001 | MFP4000 | 172.11.33.200 | PDL A | PROVIDED | PROVIDED | PROVIDED | 111111 |
| AAA10001 | MFP4000F | 172.11.33.151 | PDL A | PROVIDED | PROVIDED | PROVIDED | 111111 |
| ABC22222 | MFP5500 | 172.10.01.101 | PDL B | NOT PROVIDED | PROVIDED | NOT PROVIDED | 222222 |
| CDX33333 | MFP3100 | 172.10.01.159 | PDL C | PROVIDED | PROVIDED | PROVIDED | 333333 |
| ... | ... | ... | ... | ... | ... | ... | ... |
| 501 | 502 | 503 | 504 | 505 | 506 | 507 | 508 |

600 JOB LOG MANAGEMENT TABLE

| LOGGING DATE | UNIT NO. | AUTHENTICATION ID | NUMBER OF OUTPUT SHEETS | SHEET SIZE | BOOKBINDING | DOUBLE SPREAD | SADDLE STITCH | DOCUMENT MERGING | STAMP | BOX NO. | ... |
|---|---|---|---|---|---|---|---|---|---|---|---|
| 2008/08/31 15:31 | AAA00001 | 0045322 | 36 | A4 | ON | LEFT | ON | ON | CONFIDENTIAL | 10 | ... |
| 2008/08/31 15:20 | AAA00001 | 0045322 | 112 | A4 | ON | RIGHT | ON | ON | COPY | 10 | ... |
| 2008/08/31 15:11 | ABC22222 | 0101335 | 52 | A3 | OFF | — | — | — | CONFIDENTIAL | — | ... |
| 2008/08/31 15:00 | AAA00001 | 0045322 | 10 | A4 | OFF | — | — | ON | — | 2 | ... |
| 2008/08/31 14:20 | CDX33333 | 1000456 | 520 | A4 | ON | RIGHT | ON | ON | COPY | 3 | ... |
| 2008/08/31 14:12 | ABC22222 | 3821456 | 36 | A3 | OFF | — | — | — | — | — | ... |
| 2008/08/31 14:03 | AAA00001 | 0032567 | 78 | A4 | ON | RIGHT | ON | ON | OFFICIAL | 11 | ... |
| 2008/08/31 13:43 | AAA00001 | 0045322 | 104 | A4 | ON | RIGHT | ON | ON | COPY | 10 | ... |
| 2008/08/30 13:21 | CDX33333 | 1000456 | 300 | A4 | ON | RIGHT | ON | ON | COPY | 3 | ... |
| 2008/08/30 13:10 | AAA00001 | 0045322 | 44 | A4 | ON | — | ON | ON | COPY | 10 | ... |
| 2008/08/31 12:58 | ABC22222 | 3821456 | 120 | A4 | OFF | — | — | — | — | — | ... |
| 2008/08/31 12:40 | AAA00001 | 0045322 | 104 | A4 | ON | LEFT | ON | OFF | — | — | ... |
| ... | ... | ... | ... | ... | ... | ... | ... | ... | ... | ... | ... |

FIG.8

INSTALLER
700 MANAGEMENT
TABLE

| AUTHENTICATION ID | TEMPLATE NAME/ INSTALLATION SCRIPT NAME | |
|---|---|---|
| 0045322 | 0045322AAA0000101 | ~703 |
| 3821456 | 0059405CCC4039501 | |
| 2020459 | 0194085PPP04589101 | |
| 4000052 | 1959035MPS5093501 | |
| ⋮ | ⋮ | |

800 USER MANAGEMENT TABLE

| AUTHENTICATION ID | PASSWORD | INSTALLER URL |
|---|---|---|
| 0045322 | pgyr5063832 | https://www.delivery.com/download/0045322AAA0000101 |
| 3821456 | XXXXXX | — |
| 2020459 | XXXXXX | — |
| 40000052 | XXXXXX | https://www.delivery.com/download/0059380234PSP94024 |
| ... | ... | ... |

801  802  803

804

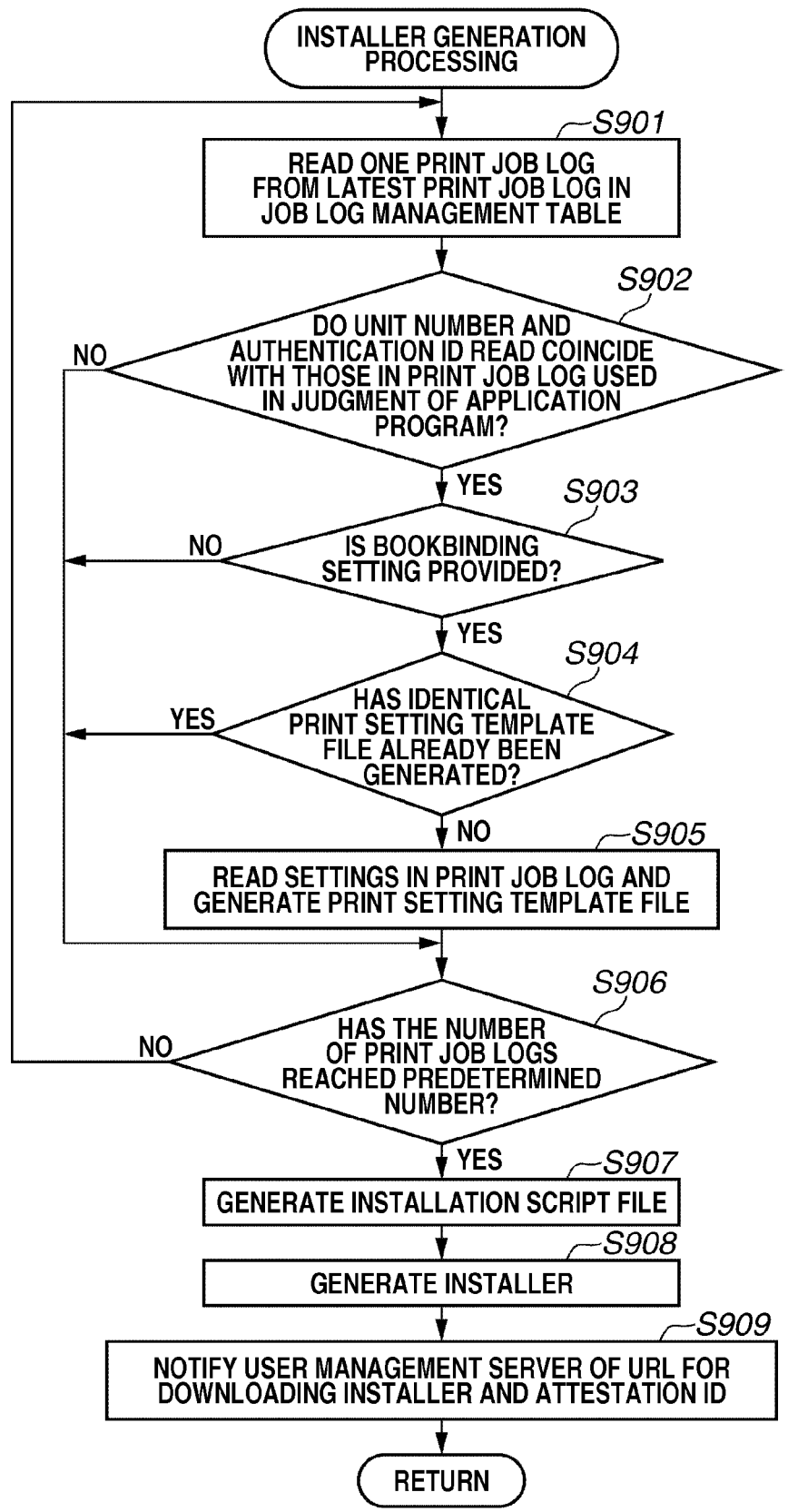

FIG.11

1000 PRINT SETTING TEMPLATE

[Template]
Name = 0045322AAA0000101
TemplateNumber = 1
Display = BOOKBINDING/LEFT/A4/SADDLE STITCH/DOCUMENT MERGING/CONFIDENTIAL
Printer = MFP4000_172.11.33.200
BOOKBINDING = ON
DOUBLE SPREAD = LEFT
SHEET SIZE = A4
SADDLE STITCH = ON
DOCUMENT MERGING = ON
STAMP = CONFIDENTIAL
TemplateNumber = 2
Display = BOOKBINDING/RIGHT/A4/SADDLE STITCH/DOCUMENT MERGING/COPY
Printer = MFP4000_172.11.33.200
BOOKBINDING = ON
DOUBLE SPREAD = RIGHT
SHEET SIZE = A4
SADDLE STITCH = ON
DOCUMENT MERGING = ON
STAMP = COPY
TemplateNumber = 3
Display = BOOKBINDING/LEFT/A4/SADDLE STITCH
Printer = MFP4000_172.11.33.200
BOOKBINDING = ON
DOUBLE SPREAD = LEFT
SHEET SIZE = A4
SADDLE STITCH = ON
DOCUMENT MERGING = OFF
STAMP =

FIG.12

*1100* INSTALLATION SCRIPT

[Script]
Name = 0045322AAA0000101

[Application]
Name = PublishingApplication

[Template]
Name = 0045322AAA0000101

[Driver]
Printer = MFP4000_172.11.33.200
Model = MFP4000
PDL = PDL A
IP = 172.11.33.200

FIG.18

PRINT SETTING TEMPLATE 1600

[Template]
Name = 0045322AAA0000101
TemplateNumber = 1
Display = BOOKBINDING/LEFT/A4/SADDLE STITCH/DOCUMENT MERGING/CONFIDENTIAL
Printer = MFP4000_172.11.33.200
Printer = MFP4000F_172.11.33.151
BOOKBINDING = ON
DOUBLE SPREAD = LEFT
SHEET SIZE = A4
SADDLE STITCH = ON
DOCUMENT MERGING = ON
STAMP = CONFIDENTIAL
TemplateNumber = 2
Display = BOOKBINDING/RIGHT/A4/SADDLE STITCH/DOCUMENT MERGING/COPY
Printer = MFP4000_172.11.33.200
Printer = MFP4000F_172.11.33.151
BOOKBINDING = ON
DOUBLE SPREAD = RIGHT
SHEET SIZE = A4
SADDLE STITCH = ON
DOCUMENT MERGING = ON
STAMP = COPY
TemplateNumber = 3
Display = BOOKBINDING/LEFT/A4/SADDLE STITCH
Printer = MFP4000_172.11.33.200
Printer = MFP4000F_172.11.33.151
BOOKBINDING = ON
DOUBLE SPREAD = LEFT
SHEET SIZE = A4
SADDLE STITCH = ON
DOCUMENT MERGING = OFF
STAMP =

FIG.19

1700 INSTALLATION SCRIPT

[Script]
Name = 0045322AAA0000101

[Application]
Name = PublishingApplication

[Template]
Name = 0045322AAA0000101

[Driver]
Printer = MFP4000_172.11.33.200
Model = MFP4000
PDL = PDL A
IP = 172.11.33.200
Printer = MFP4000F_172.11.33.151
Model = MFP4000F
PDL = PDL A
IP = 172.11.33.151

FIG.20

*1800* PRINT SETTING TEMPLATE

```
[Template]
Name = 0045322AAA0000101
TemplateNumber = 1
Display = BOOKBINDING/LEFT/A4/SADDLE STITCH/DOCUMENT MERGING/CONFIDENTIAL
Printer = MFP4000_172.11.33.200
SerialNumber = AAA00001
BOX = 10
BOOKBINDING = ON
DOUBLE SPREAD = LEFT
SHEET SIZE = A4
SADDLE STITCH = ON
DOCUMENT MERGING = ON
STAMP = CONFIDENTIAL
TemplateNumber = 2
Display = BOOKBINDING/RIGHT/A4/SADDLE STITCH/DOCUMENT MERGING/COPY
Printer = MFP4000_172.11.33.200
SerialNumber = AAA00001
BOX = 10
BOOKBINDING = ON
DOUBLE SPREAD = RIGHT
SHEET SIZE = A4
SADDLE STITCH = ON
DOCUMENT MERGING = ON
STAMP = COPY
TemplateNumber = 3
Display = BOOKBINDING/LEFT/A4/SADDLE STITCH
Printer = MFP4000_172.11.33.200
SerialNumber = AAA00001
BOX = 10
BOOKBINDING = ON
DOUBLE SPREAD = LEFT
SHEET SIZE = A4
SADDLE STITCH = ON
DOCUMENT MERGING = OFF
STAMP =
```

FIG.21

1900 BOX ACCESS MANAGEMENT TABLE

| BOX NO. | CLIENT PERMITTED TO ACCESS |
|---|---|
| 1 | — |
| 2 | 172.11.33.101 |
| 2 | 172.11.33.112 |
| 3 | — |
| ⋮ | ⋮ |
| 9 | 172.11.33.52 |
| 10 | 172.11.33.48 |
| 11 | — |
| ⋮ | ⋮ |

1901    1902

INFORMATION DISTRIBUTION APPARATUS, METHOD FOR DISTRIBUTING INSTALLATION PROGRAM, AND STORAGE MEDIUM

BACKGROUND OF THE INVENTION

1. Field of the Invention

The present invention relates to an information distribution apparatus, a method for distributing an installation program, and a storage medium.

2. Description of the Related Art

Recent image forming apparatuses having an operation panel, such as copying machines, have enabled an advanced print instruction on the operation panel. For example, such an image forming apparatus is capable of combining a plurality of pieces of print data scanned by a scanner or received via a network, adding a stamp and heading/footer information to the print data, and further making a print instruction such as saddle stitch binding. However, making such a print instruction on the operation panel takes a certain time. For example, when a number of users share an image forming apparatus, the operation panel will be occupied by one user operating it to make a print instruction. In particular, when many of the above-mentioned advanced print instructions are used, it becomes difficult to efficiently share and use the image forming apparatus.

Meanwhile, an increasing number of application programs which can carry out the above-mentioned advanced print instructions, runs on a personal computer, which issues a print instruction to the image forming apparatus via the network (hereinafter referred to as client PC). The use of such application programs eliminates the need of operations on the operation panel, which makes it possible to efficiently share and use the image forming apparatus.

However, before using the application program, a user needs to preset in the application program the characteristics of the image forming apparatus subjected to print instruction. More specifically, the user needs to preset in the application program whether or not the image forming apparatus is capable of color printing and whether or not it is provided with bookbinding function, stamping function, and sorted discharge function. A method for making such setting in a simplified way is discussed in Japanese Patent Application Laid-Open No. 2005-63415. More specifically, Japanese Patent Application Laid-Open No. 2005-63415 discusses a method for releasing characteristic information of the image forming apparatus therefrom to the application program and for automatically making setting by using the released characteristic information from the application program.

Japanese Patent Application Laid-Open No. 2008-210284 discusses a method for customizing, when a user uses a new application program, the operation panel of the application program aiming at improving user convenience. The method discussed in Japanese Patent Application Laid-Open No. 2008-210284 allows an administrator to customize the operation panel of the application program by loading a customization setting prepared by the administrator into the application program. More specifically, the operation panel can be customized such that setting menus and items regularly needed by the user are collectively arranged at a conspicuous section on the operation panel, and those not frequently used are arranged at an inconspicuous section or hidden.

Japanese Patent Application Laid-Open No. 2007-42062 discusses a technique for presenting to the user an application which best suits the print history such as the type of print media and the type of printed data.

SUMMARY OF THE INVENTION

According to an aspect of the present invention, an information distribution apparatus includes: an acquisition unit configured to acquire log information; a generation unit configured to generate, based on the log information of the job, setting information denoting an operation setting of a device and usable by a program for operating the device; and a transmission unit configured to transmit an installation program including a set of the program and the setting information, to an information processing apparatus which gives operation instructions to the device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 6 schematically illustrates an exemplary device management table according to the first exemplary embodiment of the present invention.

FIG. 7 schematically illustrates an exemplary job log management table according to the first exemplary embodiment of the present invention.

FIG. 8 schematically illustrates an exemplary installer management table according to the first exemplary embodiment of the present invention.

FIG. 9 schematically illustrates an exemplary user management table according to the first exemplary embodiment of the present invention.

FIG. 10 is a flow chart illustrating exemplary installer generation processing performed by the application distribution server according to the first exemplary embodiment of the present invention.

FIG. 11 illustrates an exemplary print setting template file according to the first exemplary embodiment of the present invention.

FIG. 12 illustrates an exemplary installation script file according to the first exemplary embodiment of the present invention.

FIG. 18 illustrates an exemplary print setting template file according to the second exemplary embodiment of the present invention.

FIG. 19 illustrates an exemplary installation script file according to the second exemplary embodiment of the present invention.

FIG. 20 illustrates an exemplary print setting template file according to a third exemplary embodiment of the present invention.

FIG. 21 schematically illustrates an exemplary box access management table according to the third exemplary embodiment of the present invention.

DESCRIPTION OF THE EMBODIMENTS

Various exemplary embodiments, features, and aspects of the invention will be described in detail below with reference to the drawings.

The first exemplary embodiment of the present invention will be described below with reference to the accompanying drawings.

Figure 1:
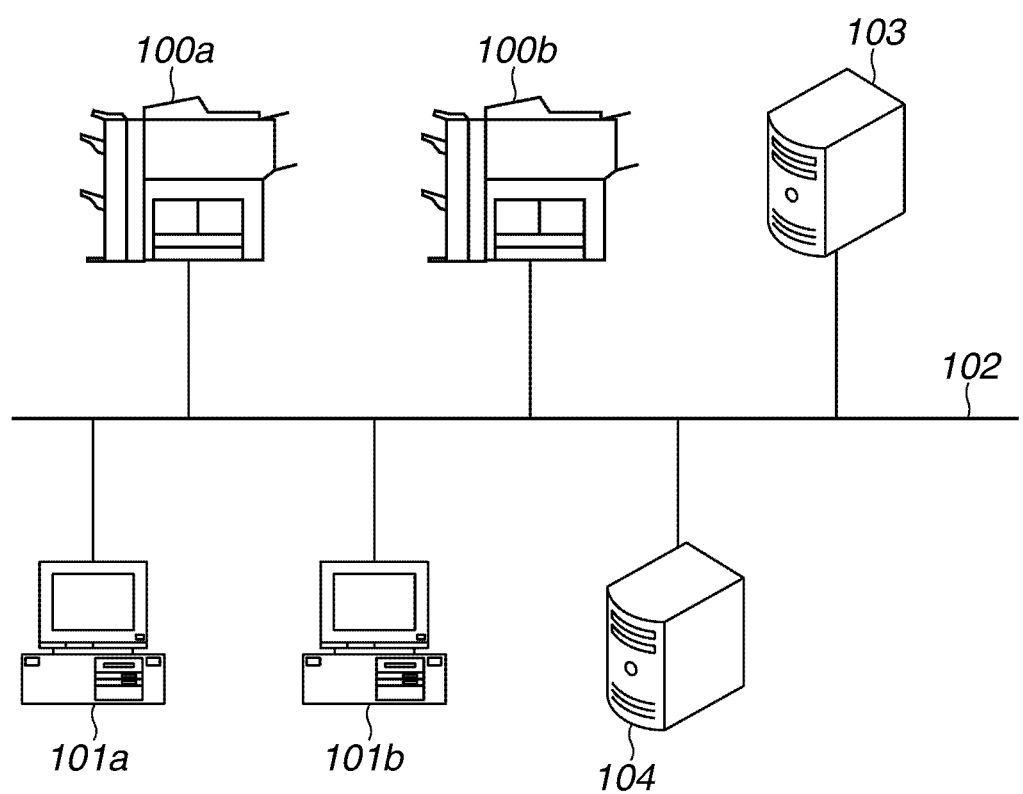
FIG. 1 illustrates an exemplary configuration of an image forming system according to a first exemplary embodiment of the present invention.

FIG. 1 illustrates an exemplary configuration of an image forming system 1001. Referring to FIG. 1, image forming apparatuses 100a and 100b perform various pieces of print processing based on instructions from a user. Each of the image forming apparatuses 100a and 100b (hereinafter simply referred to as image forming apparatus 100) also communicates with external devices via a network 102.

Client PCs 101a and 101b can perform various application programs. Each of the client PCs 101a and 101b (hereinafter simply referred to as client 101) performs operations for using the image forming apparatus 100 as a network printer via the network 102. The client PC 101 also communicates with an application distribution server 103 and a user management server 104 (described below) via the network 102.

The application distribution server 103 distributes application programs operative on the client PC 101 and print setting template files for application programs (described below) to the client PC 101. Further, the application distribution server 103 collects via the network 102 information about the history of print processing performed by the image forming apparatus 100.

The user management server 104 communicates with the image forming apparatus 100 and the client PC 101 via the network 102 to manage information about a user who operates the image forming apparatus 100 and the client PC 101. The user management server 104 performs user authentication processing when the user logs into the image forming apparatus 100 and the client PC 101.

Although the application distribution server 103 and the user management server 104 are separately configured, these may also be configured as the same single server.

Figure 2:
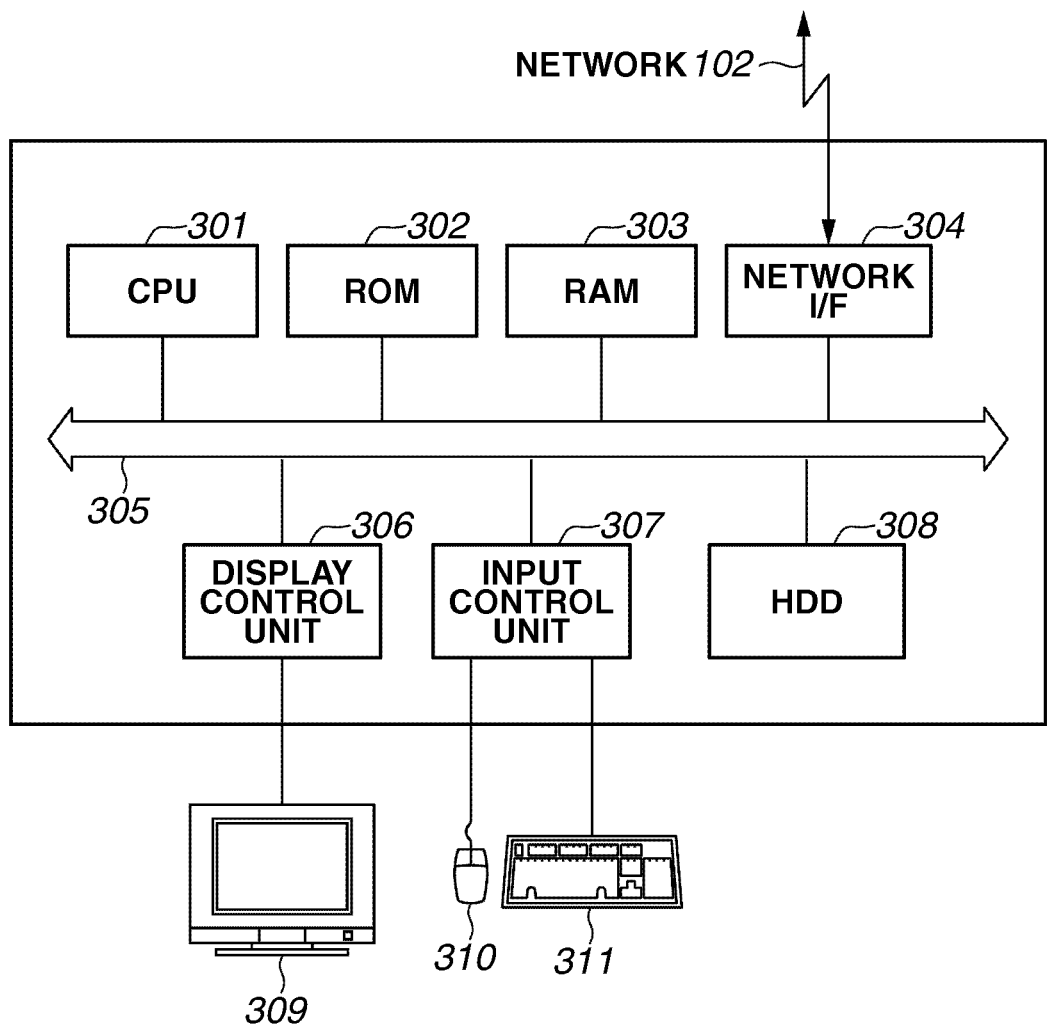
FIG. 2 is a block diagram illustrating an exemplary hardware configuration of a client PC, an application distribution server, and a user management server according to the first exemplary embodiment of the present invention.

FIG. 2 is a block diagram illustrating an exemplary hardware configuration of the client PC 101, the application distribution server 103, and the user management server 104.

The central processing unit (CPU) 301 controls the entire apparatus and executes an operating system (OS) and application programs stored in a hard disk drive (HDD) 308 to perform predetermined processing. In subsequent descriptions, processing performed by the client PC 101, the application distribution server 103, and the user management server 104 is all under control of the CPU 301. A read-only memory (ROM) 302 stores programs such as a basic I/O program, and various pieces of data such as font data and template data used in document processing. A random access memory (RAM) 303 serves as a main memory and work area for the CPU 301.

The HDD 308 stores application programs, printer driver programs, OS, and so on. A network interface (network I/F) 304 performs data communication with external devices via the network 102.

An input control unit 307 receives an input signal based on a user operation from a keyboard 311 and a mouse 310 connected thereto, and transfers the input signal to the CPU 301. A display control unit 306 displays various graphical user interface screens on a display unit 309 connected thereto.

The CPU 301, the ROM 302, the RAM 303, the network I/F 304, the display control unit 306, the input control unit 307, and the HDD 308 mutually exchange commands and data via a system bus 305.

FIG. 2 illustrates an exemplary hardware configuration of the client PC 101, the application distribution server 103, and the user management server 104. The configuration according to the present invention is not limited thereto. For example, data and programs may be stored in the ROM 302, the RAM 303, and the HDD 308 depending on their characteristics.

Figure 3:
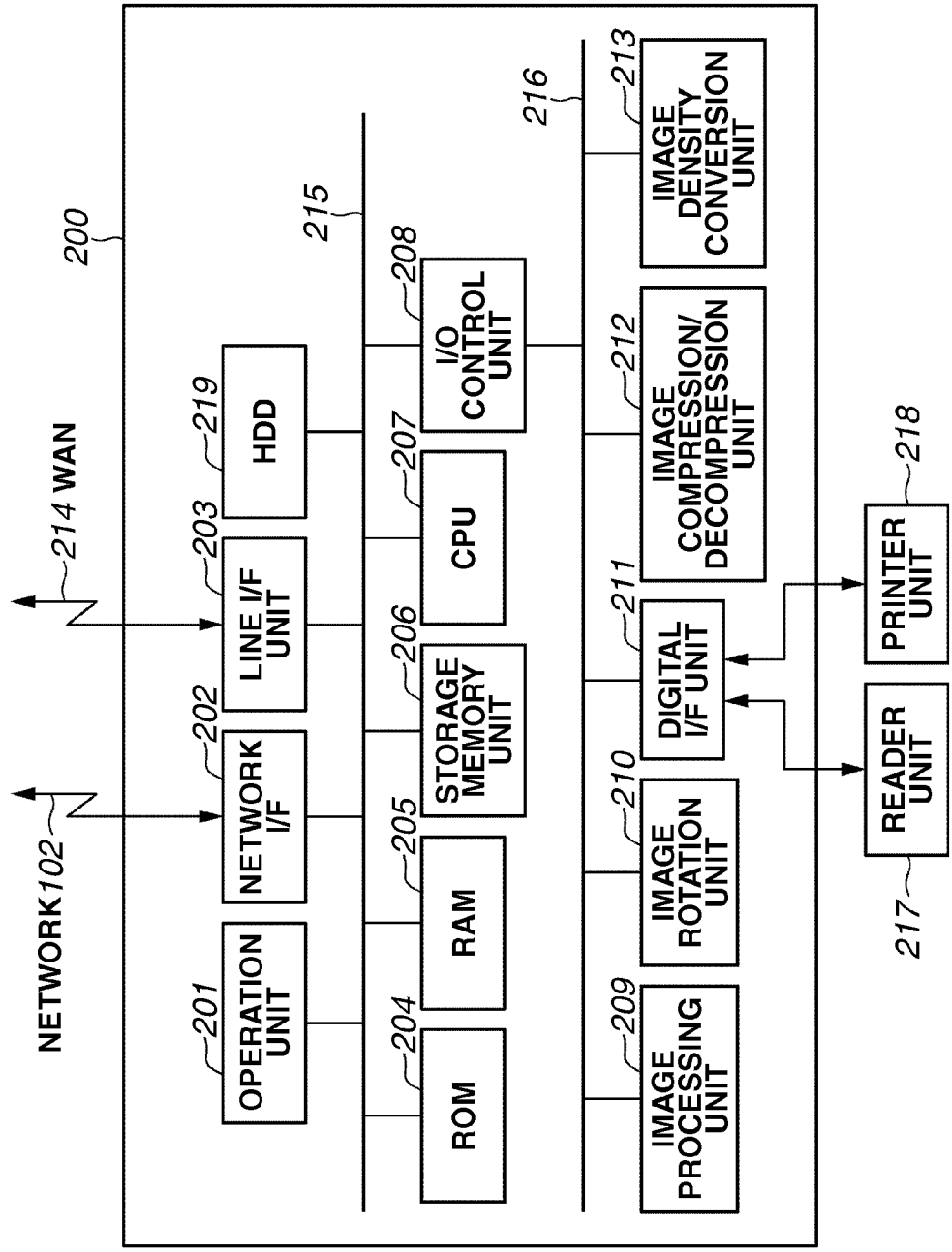
FIG. 3 is a block diagram illustrating an exemplary hardware configuration of a controller of an image forming apparatus according to the first exemplary embodiment of the present invention.

FIG. 3 is a block diagram illustrating an exemplary hardware configuration of a controller 200, which controls the image forming apparatus 100. Each component of the controller 200 is connected with a system bus 215 and an image bus 216. A CPU 207 controls the entire image forming apparatus 100 and executes an OS and application programs stored in a HDD 219 to perform predetermined processing. In subsequent descriptions, processing performed by the image forming apparatus 100 is all under control of the CPU 207.

A ROM 204 stores programs such as a basic I/O program. When the controller 200 is activated, the CPU 207 reads the basic I/O program from the ROM 204. A RAM 205 serves as a work storage area for executing a program, and also as an image memory for temporarily storing image data.

A storage memory 206 is nonvolatile memory for storing information which needs to be retained even after the image forming apparatus 100 is reactivated. This information includes, for example, operation mode settings, address books, counter values, information about failures (errors, jams, alarms, etc.), device IDs for identifying each individual image forming apparatus 100, and product names. The HDD 219 stores a large volume of image data handled in the image forming apparatus 100 and a control program of the image forming apparatus 100. A network I/F 202 is an interface unit for connecting the image forming apparatus 100 with the network 102. The network I/F 202 communicates with the client PC 101, the application distribution server 103, and the user management server 104 via the network 102.

A line I/F unit 203 is connected to ISDN or public telephone networks. The line I/F unit 203 is controlled by a communication control program in the ROM 204 to exchange data with remote terminals via an ISDN I/F, a modem, or a network control unit (NCU). The line I/F unit 203 is also used to perform facsimile transmission and reception. An operation panel 201 includes a display unit and a key input unit which are controlled by the CPU 207. The user issues instructions for reading an image from a scanner, setting print output conditions, and starting and stopping these peripheral devices via the key input unit. The above-mentioned components are arranged on the system bus 215.

An I/O control unit 208 serves as a bus bridge for mutually connecting the system bus 215 and an image bus 216 to transmit image data at high speed. The following function units are arranged on the image bus 216. A digital I/F unit 211 mutually connects a reader unit 217 and a printer unit 218 with the controller 200 of the image forming apparatus 100 to convert synchronous image data to asynchronous image data and vice versa.

Pieces of information detected by various sensors disposed at various portions in the reader unit 217 and the printer unit 218 flow to the system bus 215 via the digital I/F unit 211 and the I/O control unit 208. An image processing unit 209 corrects, processes, and edits input image data and output image data. An image rotation unit 210 rotates image data. The image compression/decompression unit 212 performs JPEG compression/decompression processing for multi-value image data and JBIG/MMR/MR/MH compression/decompression processing for binary image data. The image density conversion unit 213 performs resolution conversion for output image data.

Owing to a control program executed by the CPU 207 (hereinafter referred to as firmware as required), the CPU 207 can communicate with the application distribution server 103 via the network I/F 202 as necessary. This communication aims at notifying the application distribution server 103 of the contents of the print processing (hereinafter referred to as print job as required) performed by the image forming apparatus 100 under control of the CPU 207. To receive various operation instructions from the application distribution server 103, the CPU 207 periodically communicates with the application distribution server 103 for the purpose of inquiry via the network I/F 202. The CPU 207 also communicates with the user management server 104 via the network I/F 202 as necessary. This communication aims at requesting for user authentication to the user management server 104 when user authentication is required during operation on the operation panel 201 and at the time of execution of the relevant print job on the image forming apparatus 100.

Figure 4:
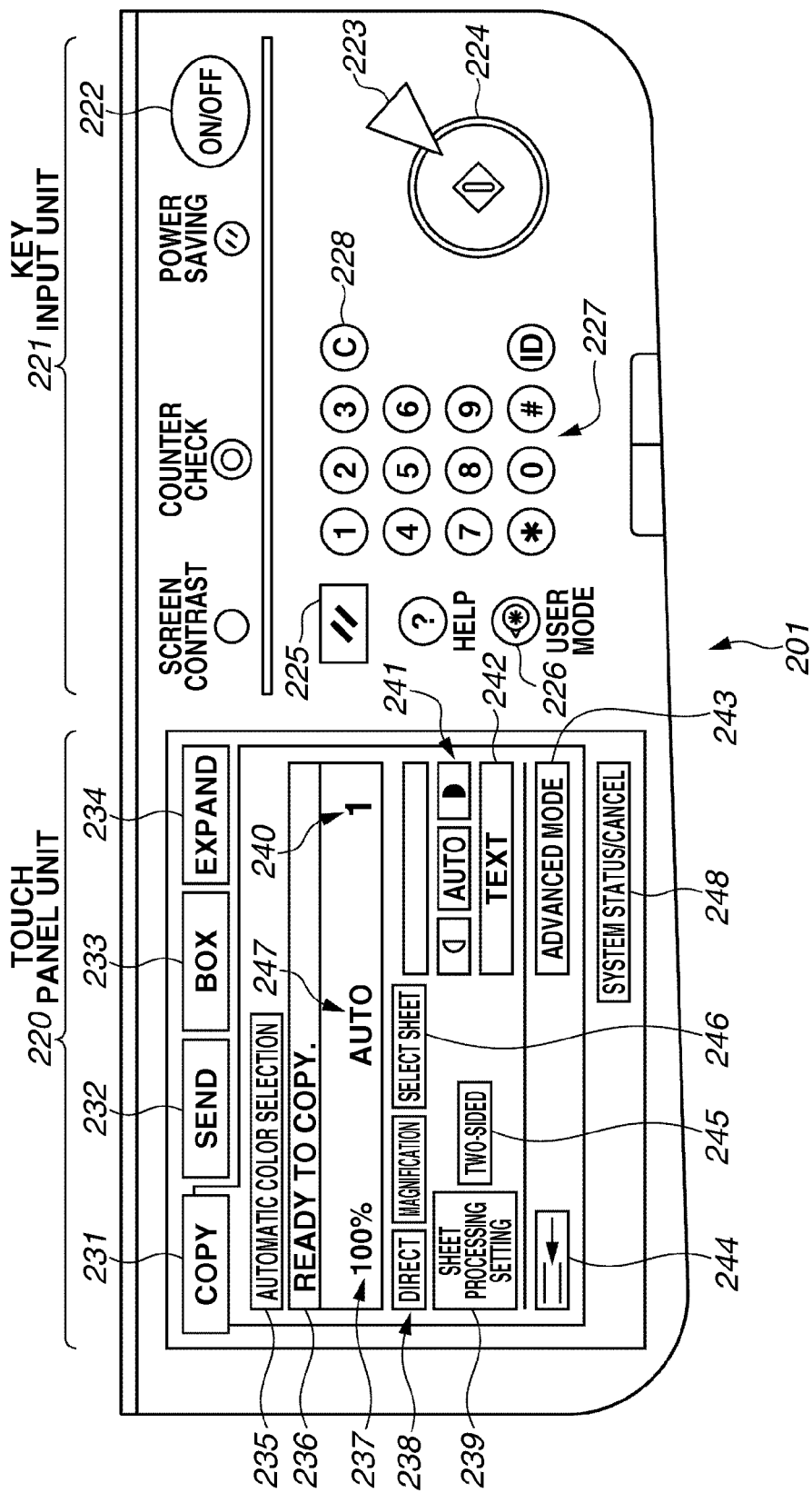
FIG. 4 illustrates an exemplary general view of an operation panel of the image forming apparatus according to the first exemplary embodiment of the present invention.

The operation panel 201 of the image forming apparatus 100 will be described in detail below with reference to FIG. 4. FIG. 4 illustrates an exemplary general view of the operation panel 201. The operation panel 201 includes a key input unit 221 that can accept user operations through hardware keys, and a touch panel unit 220 as an exemplary display unit that can accept user operations through software keys (display keys). The key input unit 221 includes an operation panel power switch 222. The CPU 207 selectively changes between a standby mode and a sleep mode in response to a user operation on the operation panel power switch 222. The standby mode denotes a regular operation state, and the sleep mode denotes a state where the touch panel unit 220 and the printer unit 218 are deactivated to save the power consumption.

The start key 224 accepts a user instruction for causing the print unit of the image forming apparatus 100 to start job processing of a type instructed by the user, such as copy operation, transmission operation, etc. for a job subjected to processing. A stop key 223 accepts a user instruction for causing the print unit to interrupt the processing of the received job processing.

A numeric keypad 227 allows the user to set register numbers for various settings. A clear key 228 cancels various parameters such as registration numbers set via the numeric keypad 227 by the user. A reset key 225 accepts a user instruction for disabling all settings made by the user for the job subjected to processing, and restoring default setting values. A user mode key 226 changes the screen of the touch panel unit 220 to the system setting screen for each user.

The touch panel unit 220 includes a touch panel composed of a LCD (liquid crystal screen) and transparent electrodes layered thereon. When the CPU 207 detects through the touch panel that a portion of an effective display key on the LCD is pressed by the user, the CPU 207 performs the following processing based on a display control program prestored in the ROM 204. More specifically, the CPU 207 displays on the touch panel unit 220 an operation panel corresponding to the pressed portion (display key operation). When a copy tab 231 is pressed by the user, the CPU 207 displays on the touch panel unit 220 an operation panel for the copy function. When a send tab 232 is pressed by the user, the CPU 207 displays on the touch panel unit 220 an operation panel for the data transmitting function such as fax transmission and E-mail transmission. When a box tab 233 is pressed by the user, the CPU 207 displays on the touch panel unit 220 an operation panel for the box function.

The box function refers to a function using a plurality of data storage areas (hereinafter referred to as boxes as required) virtually provided for each user in the HDD 219. The CPU 207 performs control so that the user can select a desired box from the plurality of boxes via the touch panel unit 220. Further, in response to a user instruction input via the touch panel unit 220, the CPU 207 stores in the box the image data captured from the reader unit 217 of the image forming apparatus 100. Further, in response to a user instruction input via the touch panel unit 220, the CPU 207 stores in the box the image data, document data, etc. received from the client PC 101 via the network 102. Furthermore, in response to a user instruction input via the touch panel unit 220, the CPU 207 performs control so that the image data, document data, etc. stored in the boxes are printed by the printer unit 218 and transmitted to external devices via the network 102.

In response to user's pressing of the box tab 233, the CPU 207 displays the operation panel of the box function on the touch panel unit 220 to allow the user to perform operations for utilizing various box functions.

When an expand tab 234 is pressed by the user, the CPU 207 displays on the touch panel unit 220 a screen for setting the expansion function such as scanner setting. When a system monitoring key 248 is pressed by the user, the CPU 207 displays on the touch panel unit 220 a screen for indicating the state of the image forming apparatus 100.

A color setting key 235 allows the user to select in advance any of color copy, monochrome copy, and automatic selection. A magnification setting key 238 displays on the touch panel unit 220 a screen for allowing the user to set the magnification such as direct printing, enlargement, and reduction.

When a two-sided key 245 is pressed by the user, the CPU 207 displays on the touch panel unit 220 a screen for allowing the user to select either one-sided or two-sided printing to be performed at the time of execution of the relevant print job. In response to user's pressing of a sheet selection key 246, the CPU 207 displays on the touch panel unit 220 a screen for allowing the user to set a feed position, sheet size, and sheet type at the time of execution of the relevant print job. In response to user's pressing of an image processing mode selection key 242, the CPU 207 displays on the touch panel unit 220 a screen for allowing the user to select an image processing mode suitable for a document image, such as text mode and photograph mode. In response to user's pressing of a density setting key 241, the CPU 207 adjusts the print density used at the time of execution of the relevant print job.

The CPU 207 also displays the operating state of the image forming apparatus 100 such as standby state, warming-up, printing, jam, error, etc. on a status display field 236 on the touch panel unit 220. Further, the CPU 207 displays on a display field 237 the print magnification used at the time of execution of the relevant print job. In addition, the CPU 207 displays on a display field 247 the sheet size and feed mode used at the time of execution of the relevant print job. Furthermore, the CPU 207 displays on a display field 240 the number of copies and the number of the sheet currently being printed at the time of execution of the relevant print job. Thus, the CPU 207 displays on the touch panel unit 220 various pieces of information about a print job to notify the user of the details thereof.

When an interruption key 244 is pressed by the user, the CPU 207 interrupts the print job currently being performed on the image forming apparatus 100, and performs another printing. When an application mode key 243 is pressed by the user, the CPU 207 displays on the touch panel unit 220 a screen for making various image processing and layout settings such as continuous copy of pages, bookbinding, cover (slip)/interleaf setting, reduction layout, stamp addition, etc.

An exemplary processing flow between the image forming apparatus 100, the client PC 101, the application distribution server 103, and the user management server 104 will be described below.

Figure 5:
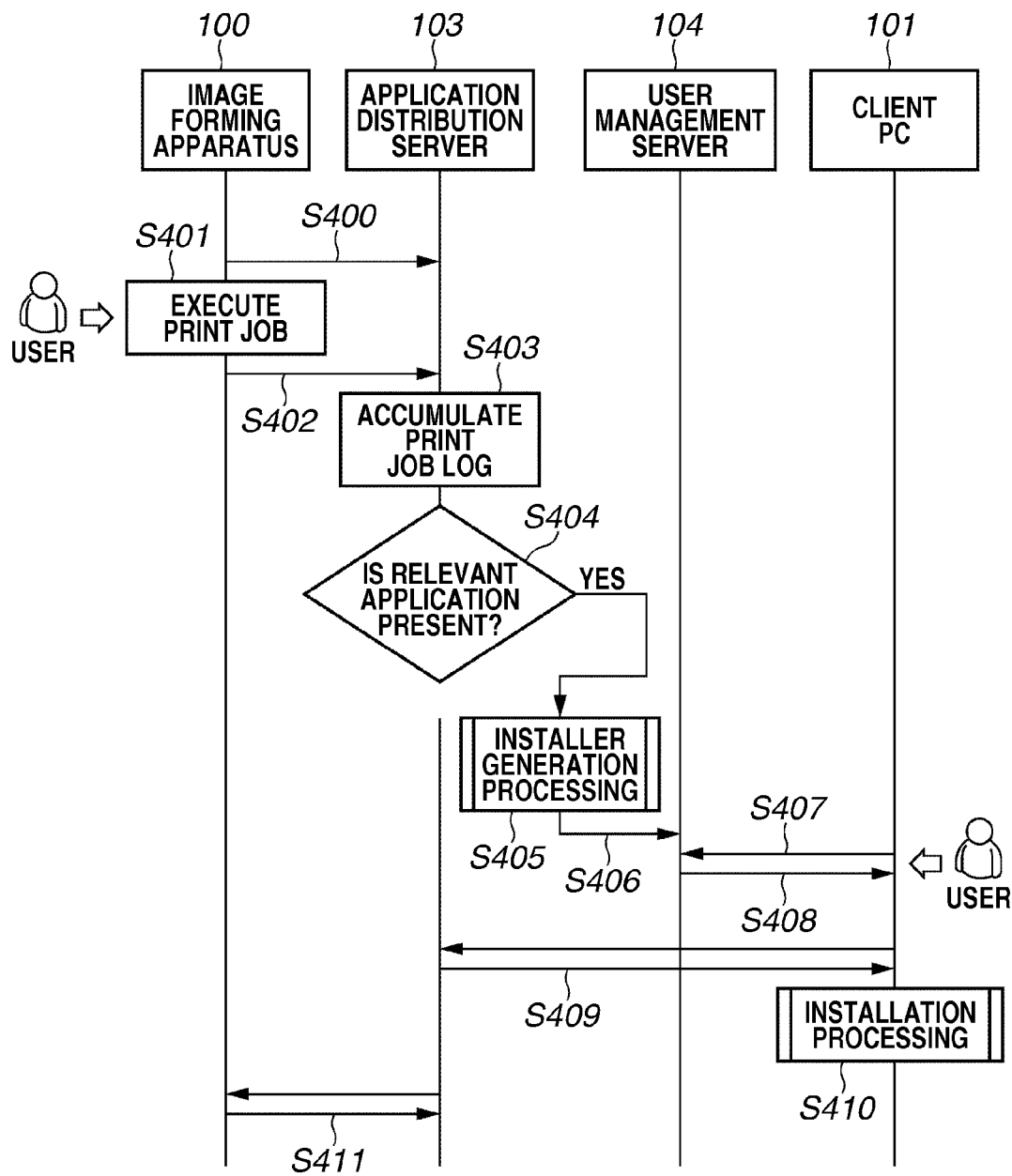
FIG. 5 is a sequence diagram illustrating exemplary processing performed between the image forming apparatus, the client PC, the application distribution server 3, and the user management server according to the first exemplary embodiment of the present invention.

FIG. 5 is a sequence diagram illustrating exemplary processing performed between the image forming apparatus 100, the client PC 101, the application distribution server 103, and the user management server 104. In step S400, the image formation apparatus 100 notifies the application distribution server 103 of the identification number uniquely denoting the image forming apparatus 100 when it connects with the network 102 for the first time and when it is activated. In the following description, an identification number uniquely denoting each image forming apparatus 100 is referred to as unit number as required. The image forming apparatus 100 also notifies the application distribution server 103 of option configuration information including its own unit number, its own network environmental settings, and a page description language (PDL) it handles. The application distribution server 103 stores these pieces of information notified in step S400 in a device management table 500 (FIG. 6) (described below).

In step S411, the image forming apparatus 100 periodically communicates with the application distribution server 103 for the purpose of inquiry to receive various operation instructions therefrom.

A user who wants to use the image forming apparatus 100 operates the operation panel 201 to input a registered authentication ID and password to the image forming apparatus 100. The image formation apparatus 100 transmits the input authentication ID and password to the user management server 104 as an authentication request. Only when the user is allowed to use the image forming apparatus 100 by the user management server 104 in response to the authentication request, the image forming apparatus 100 changes to a state where it can accept instructions such as a instruction for executing the relevant print job via the operation panel 201.

Subsequently, in step S401, the user operates the operation panel 201 to make desired print settings and give instructions for execution of the relevant print job. Upon completion of the print job, in step S402, the image formation apparatus 100 transmits a print job log to the application distribution server 103. The print job log refers to history (log) data of the print job, including the unit number, authentication ID, number of printed sheets, number of copies, sheet size used, application mode setting information, and box number when a box is used.

Upon reception of the print job log, in step S403, the application distribution server 103 stores the print job log in a job log management table 600 (FIG. 7) (described below). The application distribution server 103 also analyzes the stored print job log. In step S404, the application distribution server 103 determines, based on the result of analysis, the presence or absence of an application program running on the client PC 101 and enabling print settings equivalent to the print job log (hereinafter referred to as relevant application program). Only when the application distribution server 103 determines for the first time the presence of a relevant application program, it performs subsequent processing. In the present exemplary embodiment, subsequent descriptions will be made on an assumption that the application distribution server 103 has determined that a bookbinding print application program is a relevant application program.

In step S405, the application distribution server 103 performs installer generation processing to generate a print setting template file for the relevant application program. In step S405, the application distribution server 103 also generates an installation script for installing the relevant application program, the print setting template file, and a printer driver in the client PC 101. Further, in step S405, the application distribution server 103 generates a (packaged) installer including a set of the relevant application program, the print setting template file, and the installation script. The generated installer is stored in an installer management table 700 (FIG. 8) (described below) in the application distribution server 103.

Subsequently, in step S406, the application distribution server 103 notifies the user management server 104 of the fact that an installer for the client PC100 has been generated. This notification includes the user authentication ID and URL for downloading the installer generated in step S405. The URL for downloading the installer is necessary for the client PC 101 to download the installer stored in the application distribution server 103 in the installation processing in the client PC 101 (described below). Upon reception of the notification, the user management server 104 stores the URL for downloading the installer (installer URL) in the user management table 800 (FIG. 9) (described below).

In step S407, the user management server 104 is constantly receiving from the client PC 101a login authentication request when a user logs into the client PC 101. More specifically, the client PC 101 transmits an authentication ID and password input by the user using the keyboard 311 to request for login authentication to the user management server 104. The user management server 104 compares the authentication ID and password registered in the user management table 800 (FIG. 9) with those received in step S407 to perform user login authentication. In step S408, the user management server 104 returns the result of authentication to the client PC 101. When the URL for downloading the installer associated with the authentication ID used for user login authentication has already been stored in the user management table 800, the user management server 104 performs the following processing. The user management server 104 also returns the URL for downloading the relevant installer to the client PC 101 together with the result of user login authentication.

Upon reception of the URL for downloading the installer together with the result of user login authentication, the client PC 101 displays on the display unit 309 a message for promoting the user to download the installer, and waits for instruction input from the user. In step S409, when the user inputs a instruction for permitting downloading of the installer, the client PC 101 accesses the application distribution server 103 specified by the URL to download the installer, and starts downloading the installer.

In the present exemplary embodiment, an exemplary transmission unit is realized, for example, by performing the processing of step S409. An exemplary information processing apparatus is realized, for example, by the client PC 101. Upon completion of downloading of the installer, in step S410, the client PC 101 executes the installer in installation processing to install an application program determined to be a relevant application program in step S404.

FIG. 6 schematically illustrates an exemplary device management table 500 managed in the HDD 308 of the application distribution server 103.

The application distribution server 103 stores in the device management table 500 the above-mentioned information received from the image forming apparatus 100 in step S400 of FIG. 5. Referring to FIG. 6, a unit number 501, a model name 502, an IP address 503, a PDL 504, a bookbinding function setting 505, a stamp function setting 506, a box function setting 507, and a customer ID 508 of the image forming apparatus 100 are stored in a mutually associated way. Thus, each row of the device management table 500 denotes information about each individual image forming apparatus 100. For example, a first row 509 denotes that the relevant image forming apparatus 100 is assigned unit number "AAA00001", model name "MFT4000", IP address "172.11.33.200", and applicable PDL "PDL A". The first row 509 also denotes that the relevant image forming apparatus 100 is provided with the bookbinding function, the stamp function, and the box function. Although not illustrated, the application distribution server 103 can display on the display unit 309 the contents of the device management table 500.

The device management table 500 illustrated in FIG. 5 allows an administrator of the application distribution server 103 to set the customer ID uniquely specifying a customer owning each image forming apparatus 100. The customer ID set by the administrator is stored in the column of the customer ID 508 of the device management table 500, allowing the administrator to manage image forming apparatuses 100 on a customer basis.

In the present exemplary embodiment, an exemplary second acquisition unit is realized, for example, when the application distribution server 103 acquires the information about the device management table 500 (pieces of information 504 to 507) from the image forming apparatus 100 in step S400 of FIG. 5. For example, the PDL 504, the bookbinding function setting 505, the stamp function setting 506, and the box function setting 507 are exemplary pieces of information about the capability of each device.

FIG. 7 schematically illustrates an exemplary job log management table 600 managed in the HDD 308 of the application distribution server 103.

The application distribution server 103 stores in the job log management table 600 the above-mentioned print job log received from the image forming apparatus 100 in step S402 of FIG. 5. Each row of the job log management table 600 of FIG. 7 denotes each individual print job log. Referring to the job log management table 600, a first row 612 denotes that a generation date and time 601 of the relevant print job log is "2008/08/31 15:31", and that the image forming apparatus 100 has a unit number 602 of "AAA00001" and an authentication ID 603 of "0045322 at the time of execution of the relevant print job. From the number of output sheets 604, a sheet size 605, bookbinding 606, two-page spread 607, saddle stitch 608, and stamp 610, the first row also 612 denotes a printed material including a total of 36 A4-size sheets having a stamp of "CONFIDENTIAL" at a predetermined position, bound with leftward-opening saddle stitch. From document combination 609 and a box number 611, the first row 612 also denotes that the printed material was obtained by combining document data in a box number 10.

In the present exemplary embodiment, an exemplary acquisition unit is realized, for example, when the application distribution server 103 stores a print job log in the job log management table 600 in step S403 of FIG. 5.

FIG. 8 schematically illustrates an exemplary installer management table 700 managed in the HDD 308 of the application distribution server 103.

The application distribution server 103 stores in the HDD 308 the above-mentioned installer generated in step S405 of FIG. 5, and manages it by using the installer management table 700. Each row of the installer management table 700 of FIG. 8 denotes management information for each individual installer. Referring to the installer management table 700, a first row 703 denotes that the installer was generated based on a print job having an authentication ID 701 of "0045322", and that the installer has a unique name 702 of "0045322AAA000101."

FIG. 9 schematically illustrates an exemplary user management table 800 managed in the HDD 308 of the user management server 104.

By using the user management table 800, the user management server 104 manages an authentication ID and password registered for user authentication as mentioned above. Each row of the user management table 800 denotes management information of each individual authentication ID. Referring to the user management table 800, a first row 804 denotes that an authentication ID 801 of "0045322" is assigned a password 802 of "pgyr5063832", and that a URL 803 of the generated installer for the authentication ID is "https://www.delivery.com/download/0045322AAA0000101."

Exemplary installer generation processing (step S405 of FIG. 5) performed by the application distribution server 103 will be described below. FIG. 10 is a flow chart illustrating exemplary installer generation processing performed by the application distribution server 103.

In step S901, the application distribution server 103 reads a print job log from the latest print job log in the job log management table 600. In the present exemplary embodiment, it is assumed that the state of the job log management table 600 when the application distribution server 103 started the installer generation processing is as illustrated in FIG. 7. More specifically, it is assumed that the application distribution server 103 has determined that the bookbinding print application program is an relevant application program based on the print job log of the first row 612 of the job log management table 600.

In step S902, the application distribution server 103 performs the following processing. The application distribution server 103 determines whether or not the unit number and authentication ID in the print job log used in the determination of application program (step S404 of FIG. 4) coincide with those read in step S901. When the unit number and authentication ID in the print job log do not coincide with those read (NO in step S902), the application distribution server 103 skips steps S903 to S905 and advances processing to step S906 (described below). On the other hand, when the unit number and authentication ID in the print job log coincide with those read (YES in step S902), the application distribution server 103 advances processing to step S903. In step S903, the application distribution server 103 determines whether or not bookbinding is specified in the print job log read in step S901. As a result of the determination, when bookbinding is not specified in the print job log read in step S901 (NO in step S903), the application distribution server 103 skips steps S904 and S905 and advances processing to step S906 (described below).

On the other hand, when bookbinding is specified in the print job log read in step S901 (YES in step S903), the application distribution server 103 advances processing to step S904. In step S904, the application distribution server 103 determines whether or not a print setting template file conforming to the setting in the print job log read in step S901 has already been generated. When all settings (sheet size, two-page spread, saddle stitch, document combination, stamp, and box number) in the relevant print job log coincide with the contents of the print setting template file in question, the application distribution server 103 determines that the file has already been generated.

As a result of the determination, when a print setting template file conforming to the setting in the print job log read in step S901 has already been generated (YES in step S904), the application distribution server 103 skips step S905 and advances processing to step S905 (described below). On the other hand, when a print setting template file conforming to the setting in the print job log read in step S901 has not yet been generated (NO in step S904), the application distribution server 103 advances processing to step S905. In step S905, the application distribution server 103 generates a print setting template file based on the setting in the print job log read in step S901, and advances processing to step S906. Instead of this processing, the application distribution server 103 may add the setting in the relevant print job log to the print setting template file already generated.

In step S906, the application distribution server 103 determines whether or not the number of print job logs subjected to the determination in step S904 has reached a predetermined number. The predetermined number is prestored in the HDD 308 of the application distribution server 103. In the present exemplary embodiment, the predetermined number is assumed to be 5. Instead of this processing, the application distribution server 103 may determine whether or not processing is completed for all print job logs of the job log management table 600. As a result of the determination, when the number of print job logs subjected to the determination in step S904 has not yet reached the predetermined number (NO in step S906), the application distribution server 103 returns processing to step S901 to read a print job log immediately before the print job log read last in the job log management table 600. The application distribution server 103 repeats steps S901 and S906 until the number of print job logs subjected to the determination in step S904 reaches the predetermined number. When the number of print job logs subjected to the determination in step S904 reaches the predetermined number (YES in step S906), the application distribution server 103 completes the processing for generating a print setting template file, and advances processing to step S907 (described below).

FIG. 11 illustrates en exemplary description of a print setting template file generated when the application distribution server 103 advances processing to step S907. The application distribution server 103 describes in a print setting template file 1000 the text-format print settings by extracting relevant contents from the print job log. In the print setting template file 1000 of the present exemplary embodiment, three different print settings are described as templates.

In the print setting template file 1000, the top row describes a heading "[Template]", which denotes that this file is a print setting template file. The second row denotes the name of the print setting template file "Name=0045322AAA000101" denoting the association with the installer. A delimiter "TemplateNumber=" is used to delimit print settings repeatedly described. The print setting described as "TemplateNumber=1" is an extraction from the print setting in the first row 612 of the job log management table 600. The heading "Printer=MFP4000_172.11.33.200" is the name of the image forming apparatus 100 generated by the application distribution server 103 from the model name 502 and IP address 503 of the device management table 500 based on the unit number 602 of the job log management table 600. In the following description, this heading is referred to as printer name as required.

The application distribution server 103 reads from the job log management table 600 print job logs placed before the first row 612 thereof one by one according to the flowchart of FIG. 10 to generate the print setting template file 1000. Print job logs 612 (first row), 613 (second row), 614 (eighth row), 615 (tenth row), and 616 (twelfth row) of the job log management table 600 satisfy "Unit number=AAA00001", "Authentication ID=0045322", "Bookbinding=ON", and "Predetermined number=5." Since print job logs 613 (second row), 614 (eighth row), and 615 (tenth row) are an identical print setting, the application distribution server 103 describes them as a print setting template of the same type. As a result, the application distribution server 103 describes three different print settings extracted from print job logs 612 (first row), 613 (second row), and 616 (twelfth row) as print setting templates.

In the present exemplary embodiment, an exemplary generation unit is realized, for example, by generating the print setting template file 1000 in step S905 of FIG. 10 as mentioned above. Further, exemplary operation setting information is realized, for example, by the print setting template file 1000.

Returning to the description of FIG. 10, step S907 and subsequent steps of the installer generation processing will be described.

The application distribution server 103 that completed the processing for generating the print setting template file 1000 generates an installation script file in step 907. This installation script file is used to describe various installation settings required when the client PC 101 operates an installer for the bookbinding print application program. More specifically, instructions for installing the print setting template file 1000 and a printer driver are described in the installation script file.

FIG. 12 illustrates an exemplary description of an installation script file generated by the application distribution server 103 in step S907.

The application distribution server 103 describes in the installation script 1100 the text data regarding the image forming apparatus 100 assigned "Unit number=AAA00001" extracted from the device management table 500.

In the installation script 1100, the heading "[Script]" at the top row denotes the installation script 1100. The second row "Name=0045322AAA000101" denotes the association with the installer. The heading "[Application]" in the third row denotes an application program and the fourth row "Name=PublishingApplication" denotes the name of the bookbinding print application program. The heading "[Template]" in the fifth row denotes a template file and the sixth row "Name=0045322AAA000101" denotes the name of the print setting template file 1000 generated in step S905. The heading "[Driver]" in the seventh row denotes a driver file and the eighth row denotes information about the image forming apparatus 100 assigned "Unit number=AAA00001."

The application distribution server 103 extracts the information about the image forming apparatus 100 from the device management table 500. More specifically, "Printer=MFP4000#172.11.33.200" is the printer name of the image forming apparatus 100 generated by the application distribution server 103 mentioned above. The application distribution server 103 extracts "Model=MFP4000" from the model name 502, "PDL=PDL A" from the PDL 504, and "IP=172.11.33.200" from the IP address 503.

Returning to the description of FIG. 10, the application distribution server 103 performs the following processing in step S908. The application distribution server 103 combines the installer for the bookbinding print application, the generated print setting template file 1000, and the installation script 1100 into one installer. The application distribution server 103 stores the generated installer information in the above-mentioned installer management table 700 managed in the application distribution server 103 (FIG. 8). In the following description, the installer for the bookbinding print application is referred to as basic installer.

Figure 13:
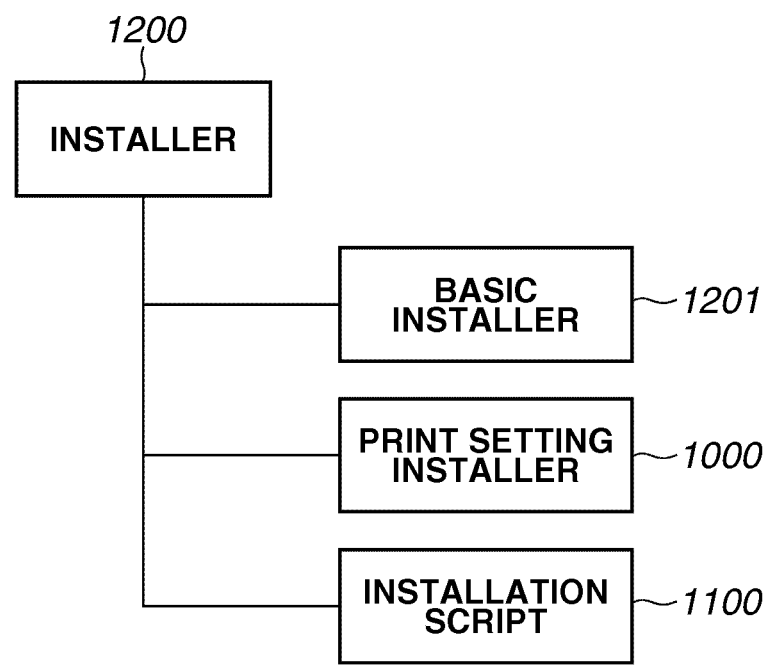
FIG. 13 schematically illustrates an exemplary packaged installer according to the first exemplary embodiment of the present invention.

FIG. 13 schematically illustrates an exemplary configuration of an packaged installer. An installer 1200 includes the basic installer 1201, the print setting template file 1000, and the installation script 1100.

Returning to the description of FIG. 10, in step S909, the application distribution server 103 notifies the user management server 104 of the fact that it has generated the installer 1200. More specifically, the application distribution server 103 reads from the job log management table 600 an authentication ID corresponding to the installer 1200 generated in step S908. Then, the application distribution server 103 notifies the user management server 104 of the URL to download the installer 1200 generated in step S908 and the authentication ID corresponding to the installer 1200. Upon reception of the notification, the user management server 104 stores the contents of the notification in the above-mentioned user management table 800. The user management server 104 also stores in the user management table 800 a password corresponding to the received authentication ID out of passwords acquired from the user in advance.

This completes detailed description of the installer generation processing performed by the application distribution server 103 (step S405 of FIG. 5).

Figure 14:
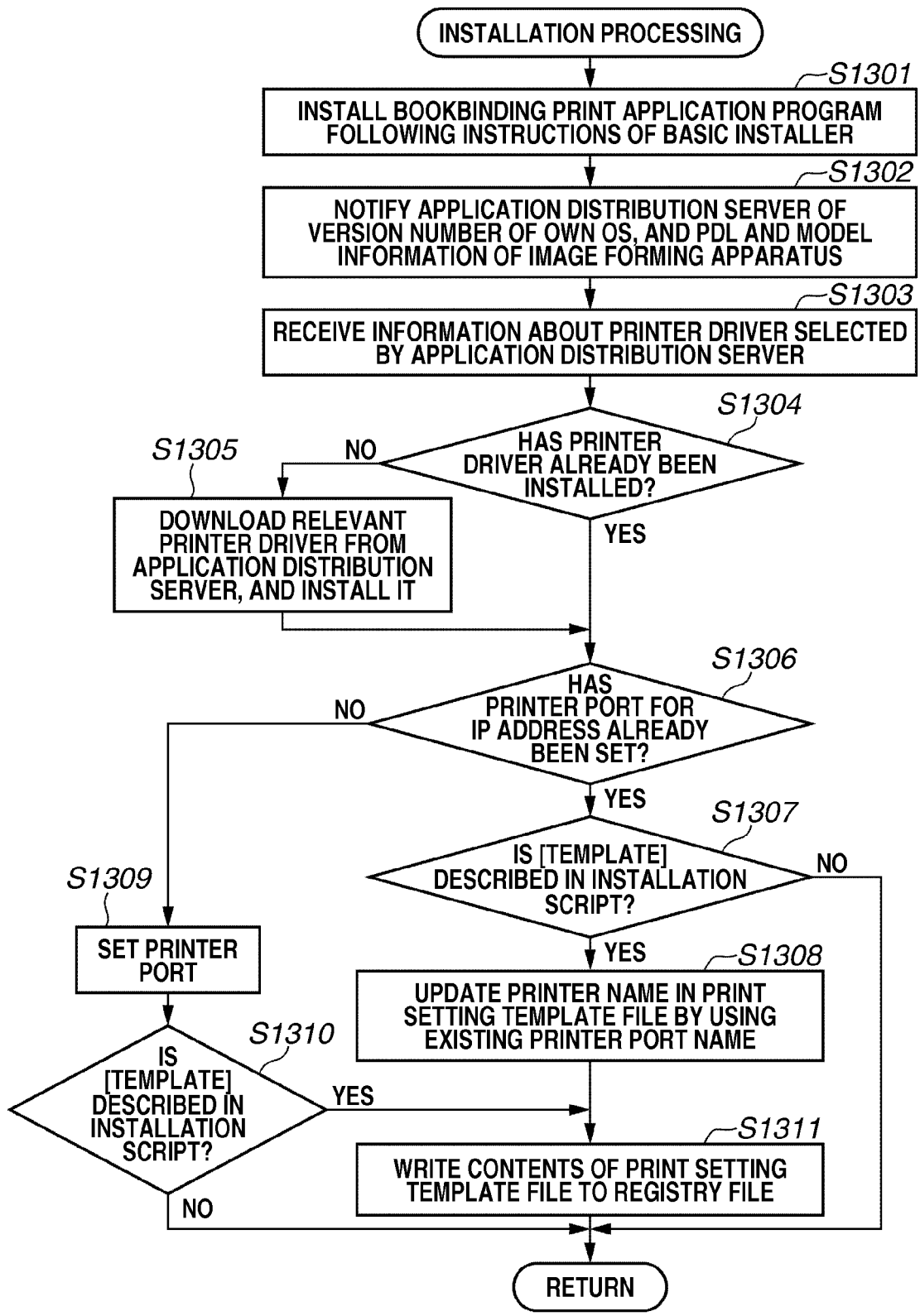
FIG. 14 is a flow chart illustrating exemplary installation processing performed by the client PC according to the first exemplary embodiment of the present invention.

Then, exemplary installation processing performed by the client PC 101 (step S410 of FIG. 5) will be described in detail below. In the present exemplary embodiment, descriptions will be made on the premise that the OS on the client PC 101 is Windows (trademark) of Microsoft Corporation. FIG. 14 is a flow chart illustrating exemplary installation processing performed by the client PC.

The client PC 101 that downloaded the installer 1200 from the application distribution server 103 executes the installer 1200 to start processing according to instructions of the installation program. In step S1301, the client PC 101 installs the bookbinding print application program according to instructions of the basic installer 1201. More specifically, the client PC 101 stores in a predetermined directory in the HDD 308 of the client PC 101 the bookbinding print application program included in the basic installer 1201 and various setting files. The client PC 101 also stores in the registry file managed in the HDD 308 of the client PC 101 by the OS the name of the bookbinding print application program and default settings for activation. Then, the user can execute the bookbinding print application program on the client PC 101.

In step S1302, the client PC 101 notifies via the network 102 the application distribution server 103 of the version number of its own OS, and applicable PDL and model name of the image forming apparatus 100 in the installation script 1100. Referring to the installation script 1100 of FIG. 12, the information about the PDL applicable to the image forming apparatus 100 is "PDL A", and the information about the model name of the image forming apparatus 100 is "MFP4000." Upon reception of the notification, the application distribution server 103 selects a suitable printer driver. This selection is made based on the OS version number, the PDL applicable to the image forming apparatus 100, and information about association of the model name of the image forming apparatus 100 with a printer driver (not illustrated) managed in the application distribution server 103. Then, the application distribution server 103 returns the information about the selected printer driver to the client PC 101. In step S1303, the client PC 101 receives the information about the printer driver.

In step S1304, the client PC 101 determines whether or not the printer driver corresponding to the information received in step S1303 has already been installed therein. As a result of the determination, when the printer driver corresponding to the information received in step S1303 has not yet been installed (NO in step S1304), the client PC 101 advances processing to step S1305. In step S1305, the client PC 101 downloads the relevant printer driver from the application distribution server 103, and install it therein.

On the other hand, when the printer driver corresponding to the information received in step S1303 has already been installed (YES in step S1304), the client PC 101 advances processing to step S1306. After installing the printer driver in step S1305, the client PC 101 also advances processing to step S1306. In step S1306, the client PC 101 references the IP address of the image forming apparatus 100 described in the installation script 1100. Referring to FIG. 11, an IP address "172.11.33.200" is described in the installation script 1100. The client PC 101 determines whether or not a printer port for the IP address has already been set.

As a result of the determination, when a printer port for the IP address described in the installation script 1100 has already been set (YES in step S1306), the client PC 101 advances processing to step S1307 (described below). When a printer port for the IP address described in the installation script 1100 has not yet been set (NO in step S1306), the client PC 101 advances processing to step S1309. In step S1309, the client PC 101 sets a printer port for the relevant IP address. In this case, the printer driver installed in step S1305 is used, and the printer name is "MFP4000__172.11.33.200" described in the installation script 1100.

In step S1307, the client PC 101 determines whether or not "[Template]" is described in the installation script 1100. As a result of the determination, when "[Template]" is not described in the installation script 1100 (NO in step S1307), the client PC 101 terminates the series of installation processing according to instructions of the installation program. On the other hand, when "[Template]" is described in the installation script 1100 (YES in step S1307), the client PC 101 advances processing to step S1311. In step S1311, the client PC 101 reads the print setting template file 1000 included in the downloaded installer 1200. Then, the client PC 101 further stores the contents of the print setting template file 1000 in the registry file in which the name of the bookbinding print application program and the default settings for activation are stored in step S1301. This completes the series of installation processing according to instructions of the installation program.

Figure 15:
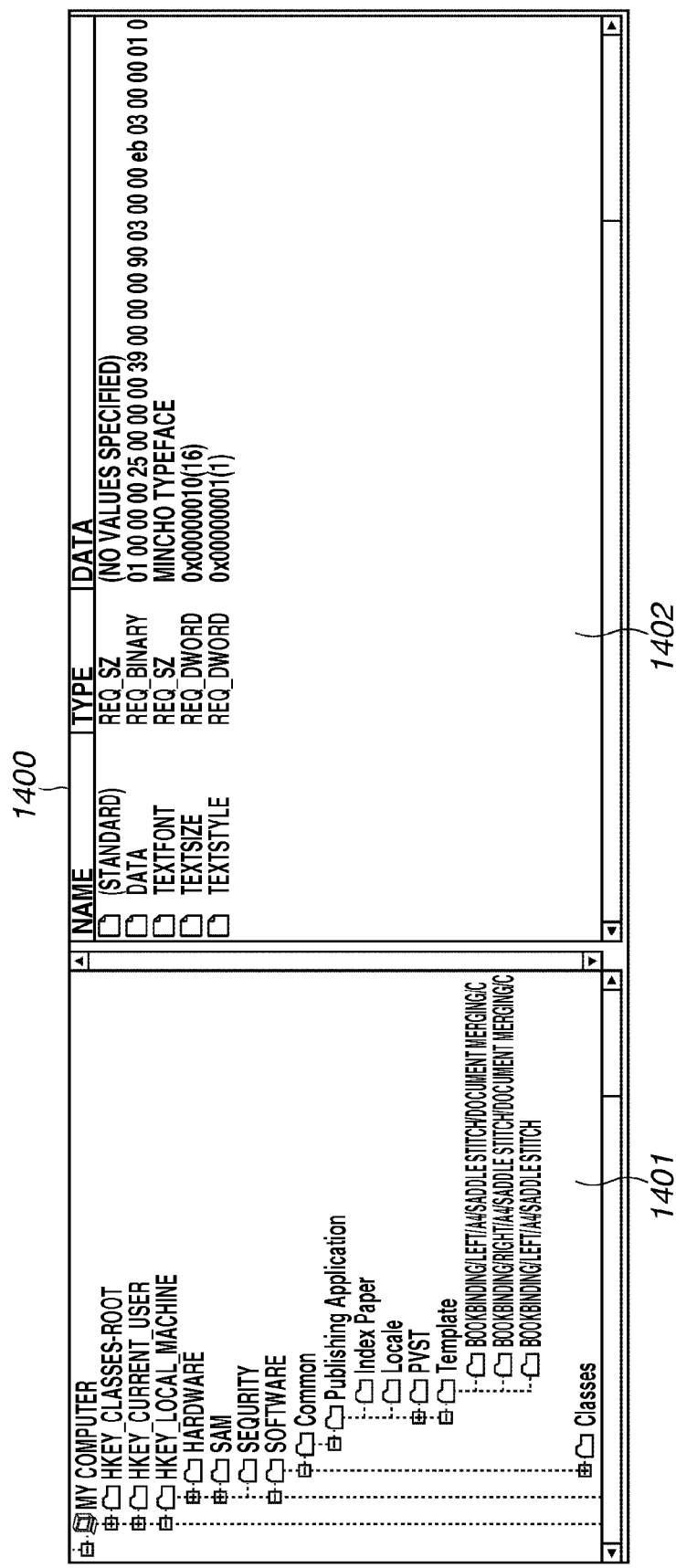
FIG. 15 illustrates an exemplary registry file storing the contents of the print setting template file according to the first exemplary embodiment of the present invention.

FIG. 15 illustrates an exemplary screen displaying the registry file in which the client PC 101 stored the contents of the print setting template file 1000 in step S1311 of FIG. 14. This screen is displayed by using registry file editing software. As illustrated in a display area 1401 of the registry file display screen 1400, the registry file has a virtual hierarchical structure. Three different templates in the print setting template file 1000 are stored in a directory "Template" which is a subordinate directory of a directory "Publishing Application" for the bookbinding print application program. A display area 1402 of the registry file display screen 1400 displays the contents of a template stored in the registry file.

Although the print setting template file 1000 includes text-format data as mentioned above, its contents are converted to binary data before being stored in the registry file. This data format conversion is performed by the client PC 101 according to instructions of the installation program.

Returning to the description of FIG. 14, when the printer port for the IP address described in the installation script 1100 has already been set (YES in step S1306), the client PC advances processing to step S1307. In step S1307, the client PC 101 determines whether or not "[Template]" is described in the installation script 1100. As a result of the determination, when "[Template]" is not described in the installation script 1100 (NO in step S1307), the client PC 101 terminates the series of installation processing according to instructions of the installation program.

On the other hand, when "[Template]" is described in the installation script 1100 (YES in step S1307), the client PC advances processing to step S1308. In step S1308, the client PC 101 reads the print setting template file 1000 included in the downloaded installer 1200. Then, the client PC 101 updates the above-mentioned printer name in the print setting template file 1000 by using the printer name in the setting of the printer port determined to have already been set in step S1306. A printer name refers to a character string following "Printer=" in the print setting template file 1000. Finally, in step S1311, the client PC 101 stores the contents of the print setting template file 1000 in the registry file in which the name of the bookbinding print application program and the default settings for activation are stored in step S1301. This completes the series of installation processing according to instructions of the installation program.

The bookbinding print application program installed in the client PC 101 is activated by the client PC 101 according to an activation instruction input by the user via the mouse 310 or keyboard 311. The client PC 101 displays on the display unit 309 a predetermined operation panel for print instruction according to the activated bookbinding print application program, and accepts print instructions from the user. Print instructions include instructions regarding image and document data to be printed by the image forming apparatus 100 and instructions regarding bookbinding printing, such as the sheet size, direction of two-page spread, binding position, heading/footer, and stamp. Based on these print instructions from the user, the client PC 101 instructs the image forming apparatus 100 to execute printing.

Figure 16:
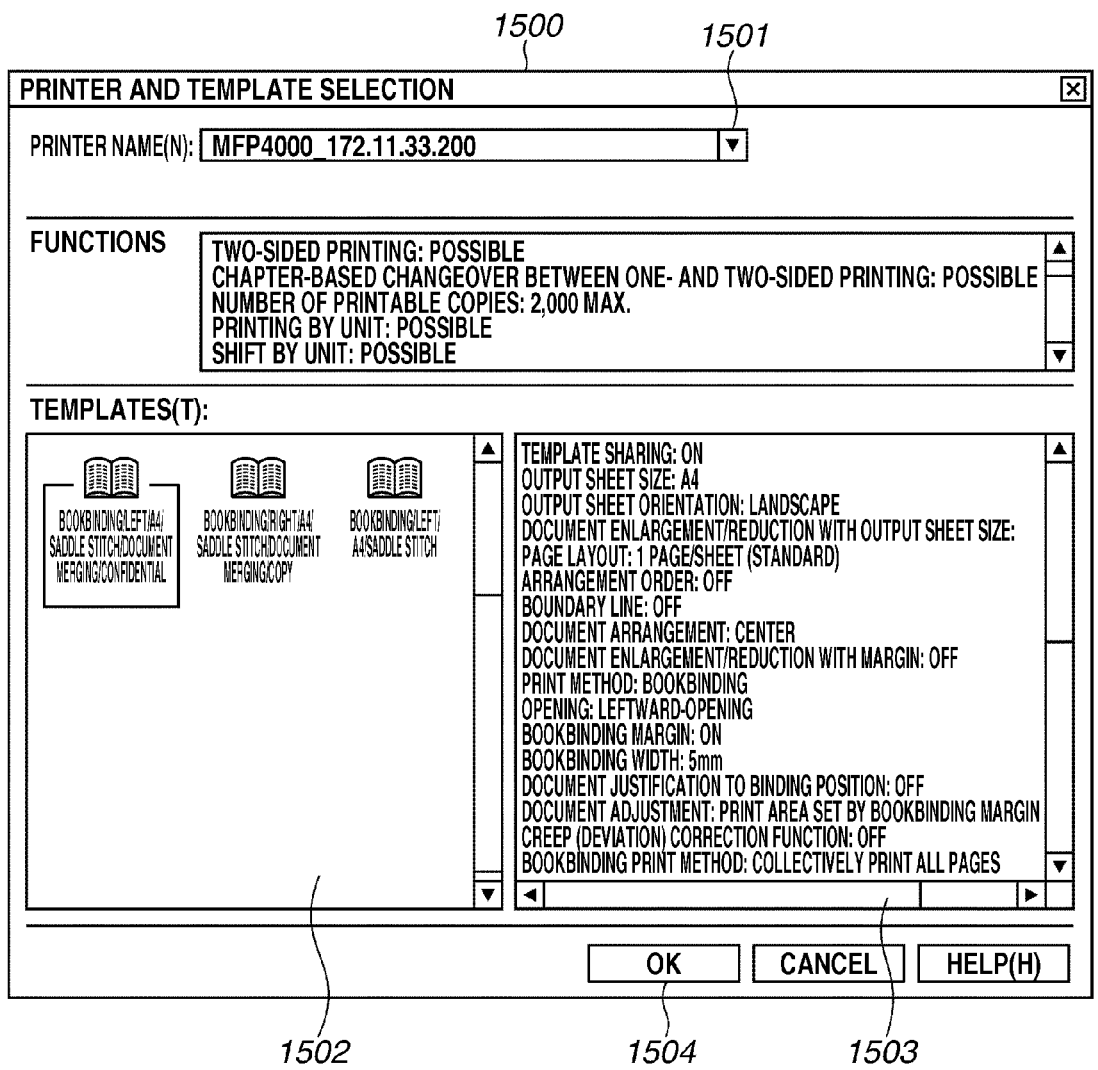
FIG. 16 illustrates an exemplary operation panel for print instruction according to the first exemplary embodiment of the present invention.

FIG. 16 illustrates an exemplary operation panel for print instruction, displayed on the display unit 309 by the client PC 101. An operation panel 1500 for print instruction is used by the user to preselect a print setting template file 1000 arranged on the file system of the client PC 101. A display area 1502 of the operation panel 1500 for print instruction displays icons corresponding to print setting template files 1000 selectable by the user. Referring to FIG. 16, the display area 1502 displays icons corresponding to three print setting template files 1000 stored in the registry file in step S1311 of FIG. 14. When the user select any one of these print setting template files 1000, the contents of the selected print setting template file 1000 are displayed in a display area 1503. A printer name display area 1501 displays the printer name described in the relevant print setting template. When the user presses an OK button 1504 with one of the print setting templates selected, the client PC 101 applies the contents of the relevant print setting template file 1000 as a print instruction.

Thus, in the present exemplary embodiment, the application distribution server 103 stores in the job log management table 600 the logs of print jobs executed by the image forming apparatus 100, and at the same time collects the information about the image forming apparatus 100 and stores it in the device management table 500. The application distribution server 103 generates print setting template files 1000 denoting the contents of print settings based on logs of print jobs. The application distribution server 103 also generates an installation script 1100 providing a guidance for installing an application program which makes a print settings based on the print setting template file 1000 and the information about the image forming apparatus 100. The application distribution server 103 distributes to the client PC 101 the installer 1200 which includes the print setting template file 1000, the installation script 1100, and the basic installer 1201 for the application program which makes print settings. The client PC 101 installs the application program according to the installer 1200. Then, when the client PC 101 issues a print instruction with the relevant application, it displays icons corresponding to the print setting template files 1000. Then, the client PC 101 issues a print instruction based on the contents of the print setting template file 1000 related to the icon selected by the user.

Therefore, the user can easily issue complicated print instructions simply by selecting a prepared print setting template. The complicated print instructions described here refers to instructions regarding bookbinding printing, such as the sheet size, direction of two-page spread, binding position, heading/footer, and stamp. In this case, the user can easily issue similar print instructions to print job instructions input via the operation panel 201 of the image forming apparatus 100. Thus, the present exemplary embodiment makes it possible to automatically include into the application program print instructions input via the operation panel of the image forming apparatus 100 by the user. Therefore, without knowing detailed operation method of the application program, the user can utilize settings based on print instructions input via the operation panel of the image forming apparatus 100 in the application program to be used.

A second exemplary embodiment of the present invention will be described below. The first exemplary embodiment has specifically been described based on a case where the client PC 101 makes a print setting for a specific image forming apparatus 100 based on print setting template files 1000. On the other hand, when equivalent print output is attained by using another image forming apparatus 100 owned by the same customer, the present exemplary embodiment allows the client PC 101 to make print settings for the image forming apparatuses 100 based on a common print setting template file 1000. The present exemplary embodiment differs from the first exemplary embodiment mainly in the processing related to the image forming apparatus 100 to which the print setting template file 1000 is to be applied. Therefore, in the description of the present exemplary embodiment, elements having the same function as those in the first exemplary embodiment (FIGS. 1 to 16) are assigned the same reference numeral and duplicated descriptions will be omitted.

Figure 17:
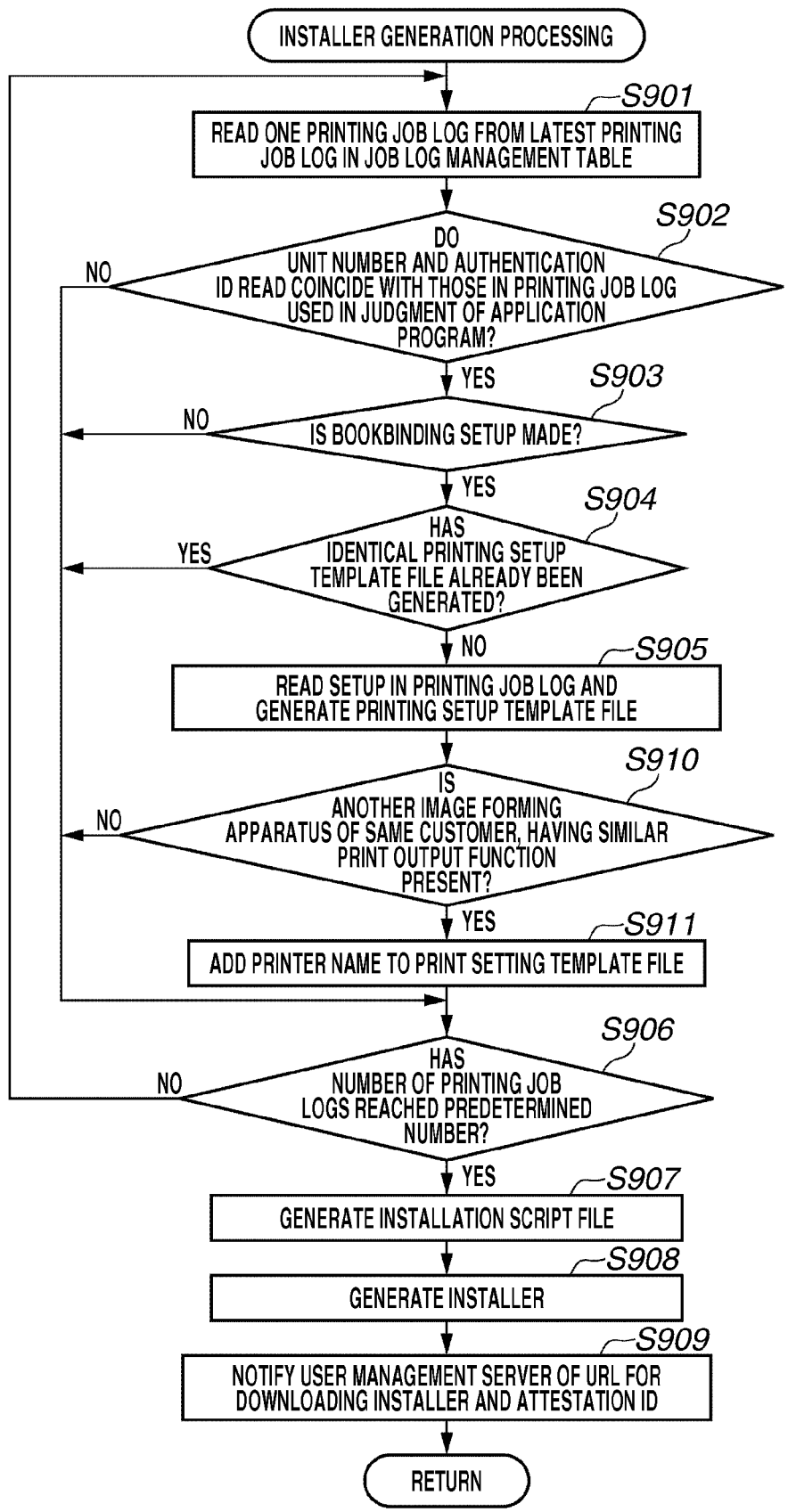
FIG. 17 is a flow chart illustrating exemplary installer generation processing performed by the application distribution server according to a second exemplary embodiment of the present invention.

FIG. 17 is a flow chart illustrating exemplary installer generation processing performed by the application distribution server 103. The present exemplary embodiment differs from the first exemplary embodiment in the installer generation processing. The difference will be described below.

In step S910, the application distribution server 103 determines whether or not there is another image forming apparatus 100 owned by the same customer, which has print output capability equivalent to that of the image forming apparatus 100 assigned the unit number used for generating the print setting template file. The application distribution server 103 performs this determination by using the above-mentioned device management table 500. More specifically, the application distribution server 103 references in the device management table 500 the information of the row including "AAA00001" as the unit number which is used for generating the print setting template file. Then, the application distribution server 103 searches in the device management table 500 for another image forming apparatus 100 having the same PDL 504, bookbinding function setting 505, stamp function setting 506, and customer ID ("111111") as those for the image forming apparatus 100 assigned unit number "AAA00001." Referring to FIG. 6, the image forming apparatus 100 assigned unit number "AAA10001" in the second row 510 satisfies this condition.

In step S911, the application distribution server 103 performs the following processing. The application distribution server 103 adds printer name "Printer=MFP4000F_172.11.33.151" for unit number "AAA10001" satisfying the specified condition to the print setting template file generated in step S905.

On the other hand, when there is not another image forming apparatus 100 (NO in step S910), the application distribution server 103 skips step S911 and advances processing to step S906.

FIG. 18 illustrates an exemplary print setting template file 1600 generated when the application distribution server 103 advances processing to step S907. The application distribution server 103 describes two different printer names for the image forming apparatuses 100 for each of the three different print settings in the print setting template file 1600. More specifically, the application distribution server 103 describes "Printer=MFP4000_172.11.33.200" and "Printer=MFP4000F_172.11.33.151."

Thus, in the present exemplary embodiment, an exemplary generation unit is attained, for example, when the application distribution server 103 generates the print setting template file 1600 in steps S905 and S911 of FIG. 17.

In step S907, the application distribution server 103 generates an installation script file, and in addition, describes an instruction for installing a printer driver for the image forming apparatus 100 assigned unit number "AAA10001."

FIG. 19 illustrates an exemplary installation script file 1700 generated in step S907 by the application distribution server 103. The application distribution server 103 describes in the installation script file 1700 the information about the image forming apparatuses 100 assigned unit numbers "AAA00001" and "AAA10001" extracted from the device management table 500. Other necessary pieces of information are extracted from the device management table 500 in the same way as the first exemplary embodiment.

The present exemplary embodiment also differs from the first exemplary embodiment in the installation processing performed by the client PC 101. In the installation processing performed by the client PC 101 illustrated in FIG. 14, the client PC 101 performs the processing of steps S1302 to S1309 for all the image forming apparatuses 100 described in the installation script file 1700. More specifically, the client PC 101 installs printer drivers and sets up printer ports for using the image forming apparatuses 100 assigned unit numbers "AAA00001" and "AAA10001."

The client PC 101 displays on the display unit 309 the operation panel 1500 for print instruction illustrated in FIG. 16 according to the bookbinding print application program installed with the method of the present exemplary embodiment. In this case, the printer name display area 1501 of the operation panel 1500 for print instruction displays the printer name described in the relevant print setting template stored in the registry file, as mentioned above. However, when a plurality of printer names are described in the print setting template, the client PC 101 displays all the printer names as a pull-down menu, allowing the user to select one of them.

Thus, the present exemplary embodiment provides print output equivalent to that of the image forming apparatus 100 to which a generated print setting template file is applied. It also provides a function to add to the relevant print setting template file other image forming apparatuses owned by the same owner as apparatuses to which the print setting template file is applicable. Therefore, also for image forming apparatuses 100 in addition to the ones regularly used, the user can easily issue similar print instructions to print job instructions input via the operation panel 201 of the image forming apparatus 100.

A third exemplary embodiment of the present invention will be described below. With the first exemplary embodiment, a method for using the box function of the image forming apparatus 100 via the client PC 101 has not been described. With the present exemplary embodiment, however, the method for using the box function of the image forming apparatus 100 via the client PC 101 will be described. The present exemplary embodiment includes a configuration and processing for using the box function of the image forming apparatus 100 via the client PC 101 in addition to those of the first and second exemplary embodiments. Therefore, in the description of the present exemplary embodiment, elements having the same function as those in the first and second exemplary embodiments (FIGS. 1 to 19) are assigned the same reference numeral and duplicated descriptions will be omitted.

The image forming apparatus 100 can make setting to limit access from the client PC 101 to boxes. When this setting is made in the image forming apparatus 100, it is necessary to make setting in the image forming apparatus 100 so as to permit access from the client PC 101 to boxes to allow it to use the box function.

For this purpose, in step S905 of installer generation processing of FIG. 10 and FIG. 17, the application distribution server 103 references the box number 611 for the print job log read from the job log management table 600 in step S901. Then, the application distribution server 103 outputs the information in the print setting template file only when the box number 611 is set in the relevant print job log.

FIG. 20 illustrates an exemplary print setting template file 1800 when the application distribution server 103 outputs the information about a box. The application distribution server 103 describes unit number "SerialNumber=AAA00001" and box number "BOX=10" of the image formation apparatus 100 for each of the three print settings in the print setting template file 1800.

In the present exemplary embodiment, an exemplary generation unit is realized, for example, when the application distribution server 103 generates the print setting template file 1800 illustrated in FIG. 20. Further, exemplary information regarding the use of a storage area of the device is realized, for example, by the box number in the print setting template file 1800.

In step S1302 of the installation processing of FIG. 14, the application distribution server 103 further performs processing for instructing the image forming apparatus 100 to make setting to allow the client PC to access a box.

Accordingly, when the application distribution server 103 receives the above-mentioned notification from the client PC 101 in step S1302, it also receives a notification of the IP address of the client PC 101. In the present exemplary embodiment, an exemplary third acquisition unit is realized, for example, by this processing.

Further, exemplary identification information is realized, for example, by the IP address. Then, the application distribution server 103 instructs the relevant image forming apparatus 100 to make setting to allow the client PC 101 to access a box by using the IP address. Accordingly, the application distribution server 103 acquires a unit number and box number for specifying a target image forming apparatus from the description of the print setting template file 1800 included in the installer downloaded in advance by the client PC 101. Upon reception of periodical communication from an image forming apparatus 100 assigned a unit number which coincides with the acquired one, the application distribution server 103 responds to it by returning the notified IP address and acquired box number to the image forming apparatus 100. In the present exemplary embodiment, an exemplary second transmission unit is realized, for example, by this processing.

Meanwhile, the image forming apparatus 100 includes a box access management table in the HDD 219, and performs access control from the client PC 101 to boxes by using this table.

FIG. 21 schematically illustrates an exemplary box access management table 1900. A box number column 1901 of the box access management table 1900 lists box numbers of a plurality of boxes provided in the image forming apparatus 100. An access-permitted client column 1902 lists IP addresses of client PCs 101 permitted to access each box number. To permit a plurality of client PCs 101 to access one box number, a plurality of rows describing the same box number are listed. Referring to FIG. 21, the client PC 101 having IP address "172.11.33.48" is permitted to access box number 10.

Upon reception of the IP address of the client PC 101 and the box number from the application distribution server 103, the image forming apparatus 100 adds these pieces of information to the box access management table 1900. With this setting, when the image forming apparatus 100 receives a request to access the relevant box number from the relevant client PC 101, it operates so as to permit the access.

In the present exemplary embodiment, thus, the application distribution server 103 adds box numbers to the print setting template file 1800 to retain the information. The client PC 101 transmits its own IP address to the application distribution server 103 at the time of installation of an application program. The application distribution server 103 transmits the IP address of the client PC 101 which is the destination of the relevant print setting template file 1800 and the box number to the image forming apparatus 100 assigned the same unit number as that described in the relevant print setting template file 1800. The image formation apparatus 100 permits the client PC 101 assigned the relevant IP address to access the relevant box number. This allows the user to utilize from a new application program a setting based on print instruction input via the operation panel of the image forming apparatus, and accordingly utilize the box function of the image forming apparatus 100 from the client PC 101.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-077065 filed Mar. 26, 2009, which is hereby incorporated by reference herein in its entirety.

What is claimed is:

1. An information distribution apparatus comprising:
   an acquisition unit configured to acquire log information of a job;
   a generation unit configured to generate, based on the log information, setting information denoting an operation setting of a device and usable by a program for operating the device;
   a transmission unit configured to transmit an installation program including a set of the program and the setting information, to an information processing apparatus which gives operation instructions to the device; and
   a second acquisition unit configured to acquire device capability information,
   wherein the generation unit generates common setting information as the setting information denoting a plurality of device settings having at least one identical part of the acquired device capability information.

2. The information distribution apparatus according to claim 1, further comprising:
   a third acquisition unit configured to acquire identification information of the information processing apparatus; and
   a second transmission unit configured to transmit to the device the acquired identification information,
   wherein, based on the log information, the generation unit acquires information about a storage area of the device used at a time of execution of the job, and generates setting information including the information about a use of the storage area as the setting information, and
   wherein the second transmission unit transmits to the device the identification information which is a destination of the setting information including the information about the use of the storage area.

3. The information distribution apparatus according to claim 1, wherein, based on the log information, the generation unit generates setting information denoting a device setting for executing the job.

4. An information processing apparatus comprising:
a reception unit configured to receive the installation program according to claim 1;
an installation unit configured to install the installation program; and
a display unit configured to display, based on the setting information included in the installation program, operation settings to allow a user to select a desired setting.

5. A method comprising:
acquiring log information of a job;
generating, based on the log information, setting information denoting an operation setting of a device and usable by a program for operating the device;
transmitting an installation program including a set of the program and the setting information, to an information processing apparatus which gives operation instructions to the device; and
acquiring device capability information,
wherein the generating generates common setting information as operation setting information denoting a plurality of device settings having at least one identical part of the acquired device capability information.

6. The method according to claim 5 further comprising:
acquiring identification information of the information processing apparatus; and
transmitting to the device the acquired identification information,
wherein, based on the log information, the generating acquires information about a storage area of the device used at a time of execution of the job, and generates operation setting information including the information about a use of the storage area as the setting information, and
wherein the second transmitting transmits to the device the identification information which is a destination of the operation setting information including the information about the use of the storage area.

7. The method according to claim 5, wherein, based on the log information, the generating generates operation setting information denoting a device setting for executing the job.

8. A method comprising:
receiving the installation program according to claim 5;
installing the installation program; and
displaying, based on the setting information included in the installation program, operation settings to allow a user to select a desired setting.

9. A non-transitory computer-readable storage medium storing a program for causing a computer to execute a method, the method comprising:
acquiring log information of a job;
generating, based on the log information, setting information denoting an operation setting of a device and usable by a program for operating the device;
transmitting an installation program including a set of the program and the setting information to an information processing apparatus which gives operation instructions to the device; and
acquiring device capability information from the device,
wherein the generating generates common setting information as the setting information denoting a plurality of device settings having at least one identical part of the acquired device capability information.

10. The non-transitory computer-readable storage medium according to claim 9, further comprising:
acquiring identification information of the information processing apparatus; and
transmitting to the device the acquired identification information,
wherein, based on the log information, the generating acquires information about a storage area of the device used at a time of execution of the job, and generates setting information including the information about a use of the storage area as the setting information, and
wherein the transmitting transmits to the device the identification information which is a destination of the operation setting information including the information about the use of the storage area.

11. The non-transitory computer-readable storage medium according to claim 9, wherein, based on the log information, the generating generates setting information denoting a device setting for executing the job.

12. A non-transitory computer-readable storage medium storing a program for causing a computer to execute a method, the method comprising:
receiving the installation program according to claim 9;
installing the installation program; and
displaying, based on the setting information included in the installation program, operation settings to allow a user to select a desired setting.

* * * * *